United States Patent
Wetterwald et al.

(10) Patent No.: US 10,491,719 B2
(45) Date of Patent: *Nov. 26, 2019

(54) INSERTION OF MANAGEMENT PACKET INTO A WIRED DETERMINISTIC PATH

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/657,283

(22) Filed: Jul. 24, 2017

(65) Prior Publication Data

US 2019/0028575 A1 Jan. 24, 2019

(51) Int. Cl.
*H04L 29/06* (2006.01)
*H04L 12/935* (2013.01)
(Continued)

(52) U.S. Cl.
CPC .............. *H04L 69/22* (2013.01); *H04L 41/04* (2013.01); *H04L 45/34* (2013.01);
(Continued)

(58) Field of Classification Search
None
See application file for complete search history.

(56) References Cited

U.S. PATENT DOCUMENTS 7,212,492 B1 *  5/2007  Au ..................... H04L 41/0681
                                                       370/229
7,366,111 B2     4/2008  Thubert et al.
(Continued)

FOREIGN PATENT DOCUMENTS

WO     WO-2018015425 A1 *  1/2018  ........... H04L 45/121

OTHER PUBLICATIONS

Wang et al., "6TiSCH Operation Sublayer (6top) Interface", [online], Jul. 6, 2015, [retrieved on Jan. 27, 2016]. Retrieved from the Internet: <URL: https://tools.ietf.org/pdf/draft-ietf-6tisch-6top-interface-04.pdf>, pp. 1-34.
(Continued)

*Primary Examiner* — Donald L Mills
(74) *Attorney, Agent, or Firm* — Leon R. Turkevich

(57) ABSTRACT

In one embodiment, a method comprises: a first network device in a deterministic network identifying at least one of first and second deterministic transmit opportunities for transmission of a data packet toward a destination device along a deterministic path of the deterministic network, the first deterministic transmit opportunity reserved for the first network device deterministically receiving the data packet from a second network device and the second deterministic transmit opportunity reserved for deterministic transmission by the first network device of the data packet toward the destination device along the deterministic path; the first network device detecting an absence of receiving the data packet from the second network device according to the first deterministic transmit opportunity; and the first network device selectively generating and deterministically transmitting according to the second deterministic transmit opportunity, in response to the absence of receiving the data packet, a management packet along the deterministic path.

20 Claims, 8 Drawing Sheets

(51) Int. Cl.
*H04L 12/721* (2013.01)
*H04L 12/24* (2006.01)
*H04L 12/775* (2013.01)
*H04L 12/26* (2006.01)

(52) U.S. Cl.
CPC ...... *H04L 49/3009* (2013.01); *H04L 41/0853* (2013.01); *H04L 43/0817* (2013.01); *H04L 43/0835* (2013.01); *H04L 45/58* (2013.01)

(56) References Cited

U.S. PATENT DOCUMENTS

| | | | |
|---|---|---|---|
| 7,593,377 | B2 | 9/2009 | Thubert et al. |
| 7,885,274 | B2 | 2/2011 | Thubert |
| 7,886,075 | B2 | 2/2011 | Molteni et al. |
| 2006/0146887 | A1 | 7/2006 | Muguruma et al. |
| 2007/0074264 | A1* | 3/2007 | Vesma ............... H04L 1/0057 725/135 |
| 2010/0074273 | A1 | 3/2010 | Ji et al. |
| 2011/0299455 | A1 | 12/2011 | Ordentlich et al. |
| 2012/0051253 | A1 | 3/2012 | Ji et al. |
| 2012/0236705 | A1* | 9/2012 | Hayashi ............ H04L 1/1887 370/216 |
| 2013/0083722 | A1 | 4/2013 | Bhargava et al. |
| 2013/0295921 | A1 | 11/2013 | Bhargava et al. |
| 2014/0016469 | A1* | 1/2014 | Ho ................... H04L 47/38 370/235 |
| 2014/0153505 | A1 | 6/2014 | Pantelidou |
| 2014/0269474 | A1* | 9/2014 | Zhu ................. H04W 52/0216 370/311 |
| 2014/0286343 | A1* | 9/2014 | Sung ............... H04L 45/24 370/400 |
| 2015/0023326 | A1 | 1/2015 | Thubert et al. |
| 2015/0078333 | A1 | 3/2015 | Byers et al. |
| 2016/0105704 | A1* | 4/2016 | Gardner ........... H04N 21/2662 725/109 |
| 2016/0269096 | A1 | 9/2016 | Thubert et al. |
| 2016/0308793 | A1 | 10/2016 | Levy-Abegnoli et al. |
| 2018/0160424 | A1* | 6/2018 | Cavalcanti ........ H04B 7/0408 |
| 2018/0227067 | A1* | 8/2018 | Hu ................. H04J 3/0658 |
| 2018/0316729 | A1* | 11/2018 | Chauvet ............ H04L 63/20 |

OTHER PUBLICATIONS

Thubert, Ed., "An Architecture for IPv6 over the TSCH mode of IEEE 802.15.4", [online], Nov. 26, 2015, [retrieved on Jan. 27, 2016]. Retrieved from the Internet: <URL: https://tools.ietf.org/pdf/draft-ietf-6tisch-architecture-09.pdf>, pp. 1-47.
Sudhaakar et al., "6TiSCH Resource Management and Interaction using CoAP", [online], Mar. 9, 2015, [retrieved on Jan. 27, 2016]. Retrieved from the Internet: <URL: https://tools.ietf.org/pdf/draft-ietf-6tisch-coap-03.pdf>, pp. 1-16.
Vilajosana et al., "Minimal 6TiSCH Configuration", [online], Jan. 16, 2016, [retrieved on Jan. 27, 2016]. Retrieved from the Internet: <URL: https://tools.ietf.org/pdf/draft-ietf-6tisch-minimal-14.pdf>, pp. 1-28.
Palattella, et al., "Terminology in IPv6 over the TSCH mode of ISSS 802.15.4e", [online], Nov. 2, 2015, [retrieved on Jan. 27, 2016]. Retrieved from the Internet: <URL: https://tools.ietf.org/pdf/draft-ietf-6tisch-terminology-06.pdf>, pp. 1-14.
Winter, et al., "RPL: IPv6 Routing Protocol for Low-Power and Lossy Network", Internet Engineering Task (IETF), Request for Comments: 6550, Mar. 2012, pp. 1-157.
Watteyne, et al., "Using IEEE 802.15.4e Time-Slotted Channel Hopping (RSCH) in the Internet of Things (IoT): Problem Statement", Internet Engineering Task Force (IETF), Request for Comments: 7554, May 2015, pp. 1-23.
Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.
TTTech, "Time-Triggered Ethernet—A Powerful Network Solution for Multiple Purpose", [online], [retrieved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper.pdf&hash=0560afac568e8db0ee899519f1f95b4b&eID=fileDownload>, pp. 1-14.
Wikipedia, "Generalized Multi-Protocol Label Switching", [online], Aug. 18, 2014, [retrieved on Feb. 4, 2016]. Retrieved from the Internet: <URL: https://en.wikipedia.org/w/index.php?title=Generalized_Multi-Protocol_Label_Switching&printable=yes>, pp. 1-2.
Thubert et al., U.S. Appl. No. 14/642,066, filed Mar. 9, 2015.
Levy-Abegnoli et al., U.S. Appl. No. 14/816,108, filed Aug. 3, 2015.
Thubert et al., U.S. Appl. No. 15/009,872, filed Jan. 29, 2016.
Wetterwald et al., U.S. Appl. No. 15/089,731, filed Apr. 4, 2016.
Thubert et al., U.S. Appl. No. 15/055,690, filed Feb. 29, 2016.
Braden et al., "Resource ReSerVation Protocol (RSVP)—Version 1 Functional Specification", Network Working Group, Request for Comments: 2205, Sep. 1997, pp. 1-112.
Farrel et al., "Inter-Domain MPLS and GMPLS Traffic Engineering—Resource Reservation Protocol-Traffic (RSVP-TE) Extensions", Network Working Group, Request for Comments: 5151, Feb. 2008, pp. 1-25.
Wikipedia, "Audio Video Bridging", [online], Mar. 5, 2017, [retrieved on Jun. 21, 2017]. Retrieved from the Internet: <URL: https://en.wikipedia.org/wiki/Audio_Video_Bridging>, pp. 1-11.
Wikipedia, "Time-Sensitive Networking", [online], May 22, 2017, [retrieved on Jun. 21, 2017]. Retrieved from the Internet: <URL: https://en.wikipedia.org/wiki/Time-Sensitive_Networking>, pp. 1-7.
Wetterwald et al., U.S. Appl. No. 15/089,711, filed Apr. 4, 2016.
Thubert et al., U.S. Appl. No. 15/642,657, filed Jul. 6, 2017.

\* cited by examiner

INSERTION OF MANAGEMENT PACKET INTO A WIRED DETERMINISTIC PATH

TECHNICAL FIELD

The present disclosure generally relates to insertion of a management packet into a wired deterministic path in a deterministic network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability.

The 6TiSCH architecture specifies a Channel distribution/usage (CDU) matrix of "cells", each cell representing a unique wireless channel at a unique timeslot. The 6TiSCH architecture also specifies installation of a track allocating a sequence of cells for each hop along a path from a source to a destination, for deterministic forwarding of a data packet. Loss of the data packet along the track, however, results in unused cells "downstream" of the network device that lost the data packet.

Deterministic transmission in wired networks can use time sensitive networking (TSN) and/or audio/video bridging (AVB). Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
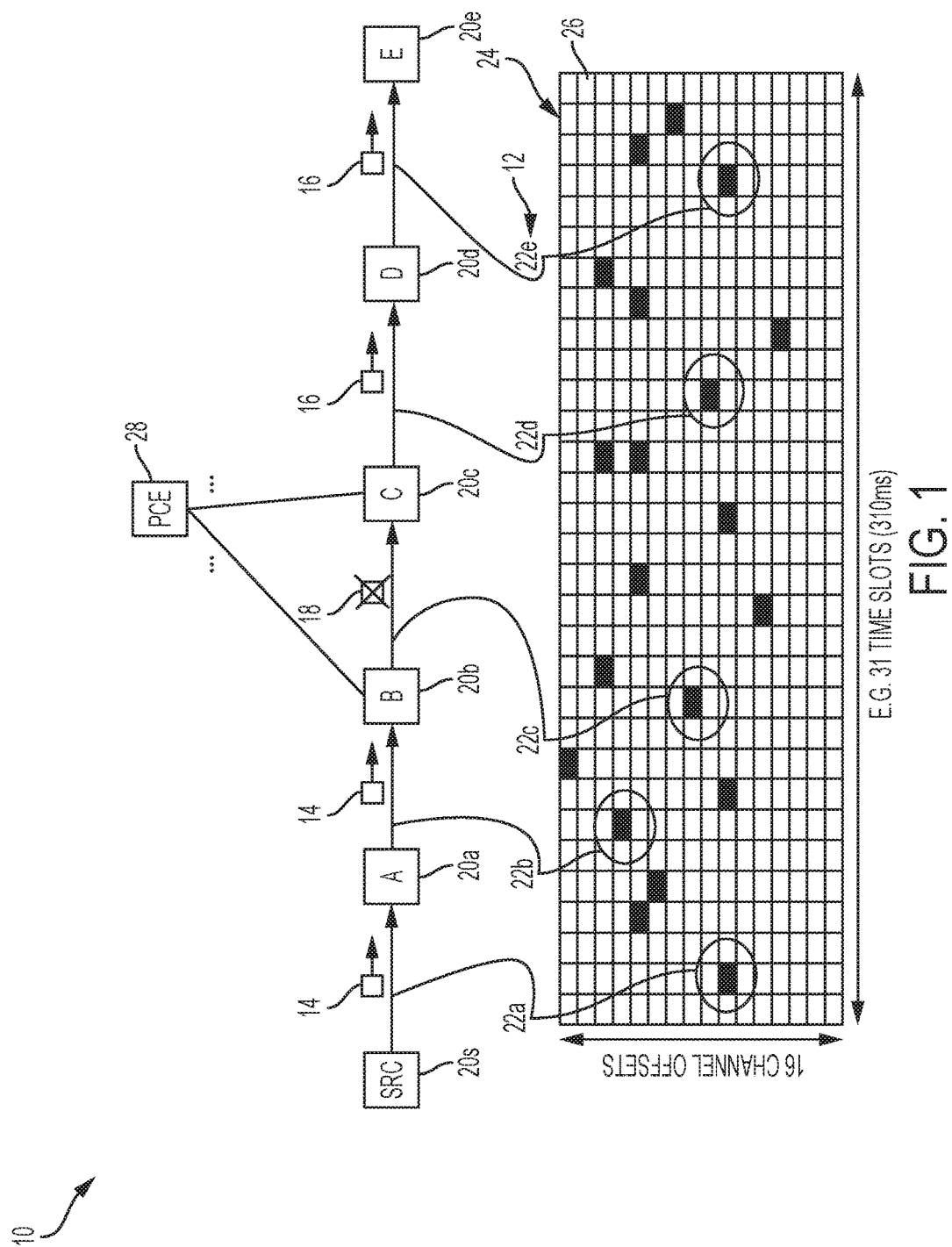
FIG. 1 illustrates an example system having an apparatus for generating and transmitting, in a deterministic transmit slot along a deterministic track allocated for a data packet, a management packet in response to a detected absence of receiving the data packet within a receive slot of the deterministic track, according to an example embodiment.

In one embodiment, a method comprises: a first network device in a deterministic network identifying at least one of first and second deterministic transmit opportunities for transmission of a data packet toward a destination device along a deterministic path of the deterministic network, the first deterministic transmit opportunity reserved for the first network device deterministically receiving the data packet from a second network device and the second deterministic transmit opportunity reserved for deterministic transmission by the first network device of the data packet toward the destination device along the deterministic path; the first network device detecting an absence of receiving the data packet from the second network device according to the first deterministic transmit opportunity; and the first network device selectively generating and deterministically transmitting according to the second deterministic transmit opportunity, in response to the absence of receiving the data packet, a management packet along the deterministic path.

In another embodiment, an apparatus comprises a device interface circuit, and a processor circuit. The processor circuit is configured for identifying at least one of first and second deterministic transmit opportunities for transmission of a data packet toward a destination device along a deterministic path of a deterministic network, the apparatus operating as a first network device in the deterministic network. The first deterministic transmit opportunity is reserved for the apparatus deterministically receiving the data packet from a second network device, and the second deterministic transmit opportunity is reserved for deterministic transmission by the apparatus of the data packet toward the destination device along the deterministic path. The processor circuit further is configured for detecting an absence of receiving the data packet from the second network device according to the first deterministic transmit opportunity. The processor circuit further is configured for selectively generating and deterministically transmitting via the device interface circuit, according to the second deterministic transmit opportunity in response to the absence of receiving the data packet, a management packet along the deterministic path.

In another embodiment, one or more non-transitory tangible media are encoded with logic for execution by a machine and when executed by the machine operable for: the machine, operating as a first network device in a deterministic network, identifying at least one of first and second deterministic transmit opportunities for transmission of a data packet toward a destination device along a deterministic path of the deterministic network, the first deterministic transmit opportunity reserved for the first network device deterministically receiving the data packet from a second network device and the second deterministic transmit opportunity reserved for deterministic transmission by the first network device of the data packet toward the destination device along the deterministic path; the first network device detecting an absence of receiving the data packet from the second network device according to the first deterministic transmit opportunity; and the first network device selectively generating and deterministically transmitting according to the second deterministic transmit opportunity, in response to the absence of receiving the data packet, a management packet along the deterministic path.

DETAILED DESCRIPTION

Particular embodiments enable a deterministic network device to execute opportunistic insertion of a management packet into a wired deterministic path, in response to determining an absence of a data packet that was scheduled to be received by the deterministic network device at a first deterministic transmit opportunity. The network device can use a second deterministic transmit opportunity, reserved for deterministic transmission of the data packet by the deterministic network device, for generation and deterministic transmission of a management packet along a deterministic path to a destination device.

Figure 6:
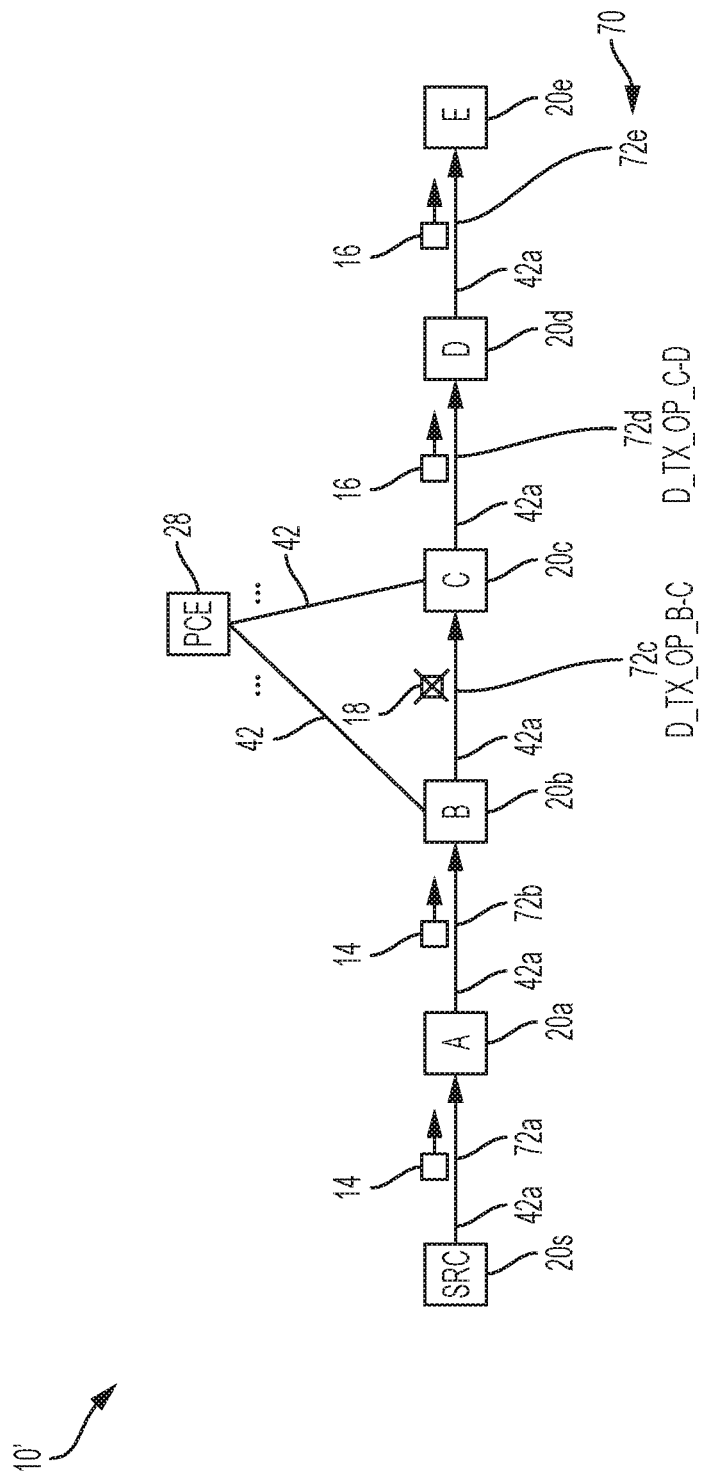
FIG. 6 illustrates an example wired deterministic network having an apparatus for generating a management packet in response to detected absence of deterministically receiving a data packet from a second network device according to a first deterministic transmit opportunity, and deterministically transmitting the management packet according to a second deterministic transmit opportunity normally allocated for transmission of the data packet by the apparatus, according to an example embodiment.

FIG. 1 and FIG. 6 illustrate example deterministic network systems (i.e., deterministic network) 10 and 10' providing a deterministic path (e.g., a wireless deterministic track 12 or a wired deterministic path 70) for deterministic forwarding of a data packet 14, and selective insertion of a management packet 16 into the deterministic path 12 or 70 in response to a detected packet loss 18, i.e., a detected absence (i.e., failure) 18 of a network device 20 receiving the data packet 14, respectively, according to example embodiments.

As described below, the example embodiments enable opportunistic insertion of a management packet 16 into a wired deterministic path 12', for example a wired deterministic path deployed according to IEEE P802.1Qbt or audio video bridging (AVB).

The following description begins with a description of opportunistic insertion of a management packet into a wireless deterministic network (e.g., a deterministic track according to 6TiSCH), followed by a description of the opportunistic insertion of a wired deterministic network.

Opportunistic Management Packet Insertion in Wireless Deterministic Network

Particular embodiments address a concern that can arise in use of a hop-by-hop deterministic track 12 of FIG. 1 for deterministic forwarding of the data packet 14 originated by a source network device (e.g., "SRC" 20s) and destined for a destination network device "E" 20e in a deterministic network, namely the failure 18 associated with receiving a data packet 14. Conventional implementations of a deterministic track 12 (e.g., Generalized Multi-protocol Label Switching (G-MPLS) according to the 6TiSCH architecture) assume that an allocated cell 22 (comprising a unique wireless channel at a unique timeslot) is reserved exclusively for deterministic forwarding of the data packet 14; however, a loss 18 of the data packet 14 along the deterministic track 12 would conventionally result in unused allocated cells 22 (e.g., 22d, 22e). Even though a network device 20 (e.g., "C" 20c) may respond to the detected failure 18 by requesting a retry to the transmitting network device 20 (e.g., "B" 20b), the allocated cells 22 along the deterministic track 12 that are "downstream" of the packet loss 18 would remain unused, as the retransmitted data packet 14 would be sent during a subsequent instance of the repeating CDU matrix 24 (i.e., repeating deterministic schedule).

According to an example embodiment, a receiving network device 20 (e.g., "C" 20c) can respond to the detected failure 18 of receiving the data packet 14 in an allocated cell 22 (e.g., 22c) by selectively generating a management packet 16, and transmitting the management packet 16 in the allocated cell 22 that was reserved for transmission of the data packet 14 by the receiving network device 20 (e.g., the allocated cell 22d). The management packet 16 can be implemented, for example, as an Operations, Administration, and Maintenance (OAM) frame. Hence, the receiving network device 20 (e.g., "C" 20c) can exploit the detected failure 18 of receiving the data packet 14 in the allocated cell 22c by generating and transmitting the management packet 16 in the allocated cell 22d, in place of the lost data packet 14. Consequently, the remaining allocated cells 22 in the deterministic track 12 (that otherwise would be unused) can still be used for transmitting the management packet 16 toward the destination network device 20 (e.g., "E" 20e). As described with below respect to FIG. 5, the management packet 16 can identify one or more attributes associated with the detected failure 18 (i.e., detected absence) of receiving the data packet 14, enabling the destination network device 20 to collect statistics on receiving the data packets 14 associated with an identifiable flow from the source network device 20 via the deterministic track 12.

Hence, the example embodiments provide an in-band management packet 16 specifying attributes associated with the detected failure 18, enabling the destination network device 20e to obtain information related to the detected failure 18, using the allocated cells 22 to transmit the management packet 16 in place of the lost data packet. The reception of the management packet 16 can enable the destination network device 20e (and/or a central controller such as a PCE 28) to determine whether the deterministic track 12 needs to be "tuned" or "modified", for example using a different path (i.e., sequence of hop-by-hop network devices 20) due to a given network device (e.g., 20b) encountering substantial wireless interference during transmission of the detected failure 18.

As illustrated in FIG. 1, each of the allocated cells 22a, 22b, 22c, 22d, and 22e of the deterministic track 12 are allocated from a CDU matrix 24 having a plurality of cells 26, each cell 26 representing a unique wireless channel at a unique timeslot. Hence, each allocated cell 22 corresponds to a unique cell 26. The CDU matrix 24 can be generated by a central controller such as a path computation element (PCE) 28. The repeatable CDU matrix 24 is illustrated as encompassing sixteen (16) frequency channel offsets over thirty-one (31) 10 millisecond (ms) timeslots identified by timeslot offsets (e.g., an Absolute Slot Number (ASN)) relative to an epochal start of time, such that the CDU matrix 24 has a total duration of 310 ms. In one embodiment, the deterministic track 12 can be generated by the PCE 28; in another embodiment, the deterministic track 12 can be generated in a distributed manner between the network devices 20 (e.g., using RSVP-TE).

The allocated cell 22a is allocated for transmission by the source network device "SRC" 20s to the network device 20a; the allocated cell 22b is allocated for transmission by the network device 20a to the network device 20b; the allocated cell 22c is allocated for transmission by the network device 20b to the network device 20c; the allocated cell 22d is allocated for transmission by the network device 20c to the network device 20d; and the allocated cell 22e is allocated for transmission by the network device 20d to the network device 20e. In one embodiment, an allocated cell 22 also could be implemented as merely a "timeslot" for a fixed wireless channel, hence a given allocated cell 22 also can be referred to herein as a "deterministic transmit slot" (for use by a transmitting network device transmitting a data packet 14), a "deterministic receive slot" (for use by a receiving network device receiving a data packet 14), or more generally the allocated cell 22 can be referred to herein as a "deterministic slot".

Figure 2:
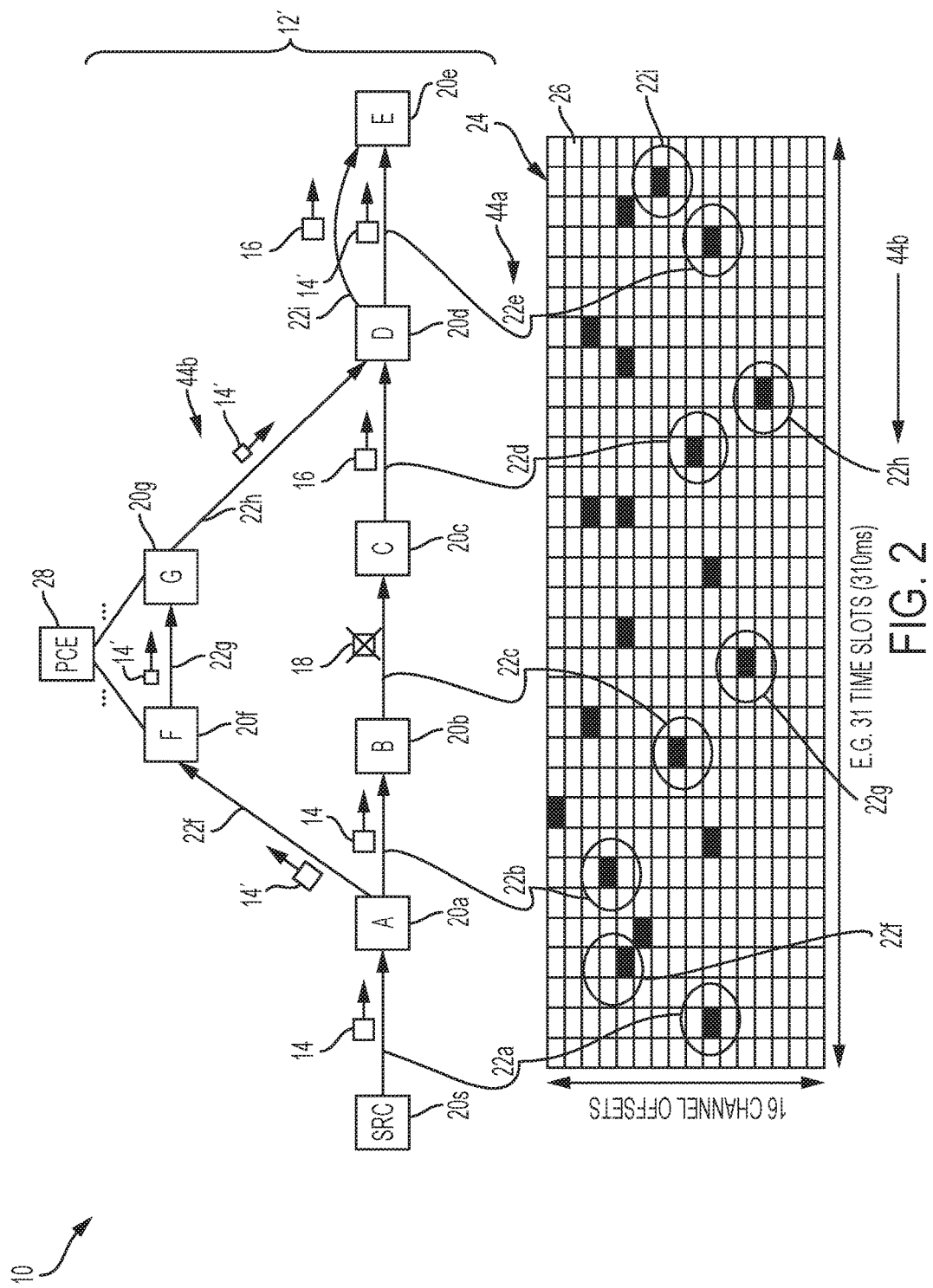
FIG. 2 illustrates another example system having an apparatus for selectively generating and transmitting, in a deterministic transmit along a deterministic track allocated for a data packet, a management packet in response to a detected absence of receiving the data packet within any receive slot of the deterministic track allocated for the data packet, according to an example embodiment.

FIG. 2 illustrates a variation in the deterministic network 10, where the deterministic track 12' comprises deterministic segments 44a and 44b that can be allocated for deterministic forwarding of the data packet 14 to the destination network device 20e. As illustrated in FIG. 2, the deterministic segment 44a is the same as the deterministic track 12 in FIG. 1 and comprises the allocated cells 22a, 22b, 22c, 22d, and 22e. A second deterministic segment 44b can be established (e.g., in parallel with the first deterministic segment 44a) as part of a packet replication-and-elimination operation deployment, where the network device 20a is the "replication node" configured for generating a replicated copy 14' of the data packet 14, and the network device 20d is the "elimination node" that eliminates transmission of a duplicate copy of the data packet 14.

The deterministic segment 44b comprises the allocated cells 22f, 22g, and 22h and can be established by the PCE 28 and/or among the different network devices 20. Hence, the network device 20a can generate a replicated data packet 14', and transmit the data packet 14' to the network device 20f using the allocated cell 22f; the network device 20f can forward the replicated data packet 14' to the network device 20g using the allocated cell 22g; and the network device 20g can forward the replicated data packet 14' to the network device 20d using the allocated cell 22h.

Although not illustrated in FIG. 2, the first deterministic segment 44a and the second deterministic segment 44b can be joined by additional interconnecting deterministic links (e.g., link "B-F" interconnecting network devices 20b and 20f; link "C-G" interconnecting network devices 20c and 20g), enabling formation of the deterministic track 12' to resemble a "ladder" structure.

As described below with respect to FIG. 4, the network device 20d can be configured as an "elimination" node that utilizes the redundancy of the multiple deterministic segments 44a and 44b in a deterministic track 12' for reception of at least one of the data packet 14 (via the deterministic segment 44a) or the replicated data packet 14' (via the deterministic segment 44b): if the network device 20d receives both the data packet 14 and the replicated data packet 14', the network device 20d can eliminate one of the redundant data packets (e.g., the replicated data packet 14'), and forward the data packet 14 via the allocated cell 22e; if the network device 20d determines an absence of receiving a data packet 14 (or absence of receiving a replicated data packet 14') from any of the allocated cell 22d or 22h, the network device 20d can generate (if needed) and output the management packet 16 on the allocated cell 22e for the deterministic segment 44a.

As illustrated in FIG. 2, if the network device 20d detects an absence in receiving either the data packet 14 or the replicated copy 14' but still receives at least one of the data packet 14 or the replicated copy 14' (e.g., receives the replicated copy 14'), the network device 20 can forward the received data packet 14' to the next-hop network device 20e along the deterministic segment 44a using the allocated cell 22e, and generate (as needed) and send the management packet 16 via a path (e.g., via the allocated cell 22i) distinct from the deterministic track 12'. As described herein the detected absence of receiving a data packet 14 (or 14') includes any one of a detected failure 18 as illustrated in FIG. 1 or 2, or the reception of a management packet 16 in place of the lost data packet 14; as described in further detail below, the management packet 16 can include information identifying the packet type (e.g., in an Ethertype header) that enables any network device 20 to distinguish between a data packet 14 and the management packet 16. Hence, the reception by the network device 20d of the management packet 16 in the allocated cell 22d from the network device 20c constitutes a detected absence of receiving the data packet 14 (as intended during allocation of the allocated cell 22d).

Figure 3:
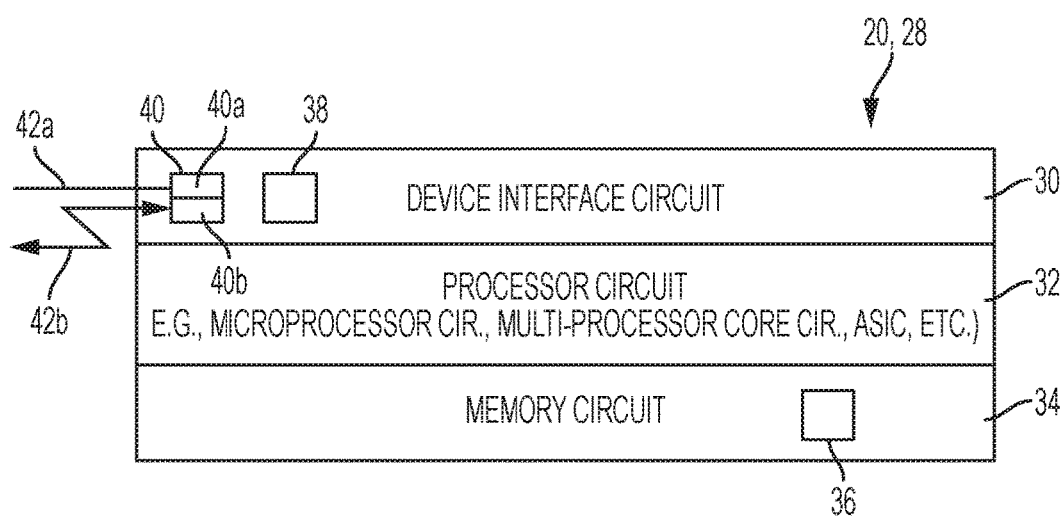
FIG. 3 illustrates an example implementation of any one of the devices of FIG. 1 or 2.

FIG. 3 illustrates an example implementation of any one of the devices 20 and/or 28 of FIG. 1 or FIG. 6, according to an example embodiment. The apparatus 20 and/or 28 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 20 and/or 28 can include a device interface circuit 30, a processor circuit 32, and a memory circuit 34. The device interface circuit 30 can include a media access control (MAC) circuit 38 and one or more distinct physical layer transceiver (PHY) circuits 40 for communication with any one of the other devices 20 and/or 28; for example, MAC circuit 38 and/or the PHY circuit 40 of the device interface circuit 30 can be implemented as an IEEE based Ethernet transceiver for communications with the devices of FIG. 1 via any type of data link 42, as appropriate; the device interface circuit 30 can include an IEEE based Ethernet transceiver (e.g., a wired transceiver 40a and/or a wireless transceiver 40b) for communications with the devices of FIG. 1 via any type of data link (e.g., a wired link 42a or wireless link 42b, an optical link, etc.). For example, the wired transceiver 40a can be implemented as an IEEE 802.1 based transceiver executing TSN, for example according to IEEE P802.1Qbt and/or a transceiver configured for credit based shaping according to AVB; the wireless transceiver 40b can be implemented as an IEEE 802.15.4e based receiver or the like. The processor circuit 32 can be configured for executing any of the operations described herein, and the memory circuit 34 can be configured for storing any data or data packets as described herein, for example in a data structure 36.

Any of the disclosed circuits of the devices 20 and/or 28 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4:
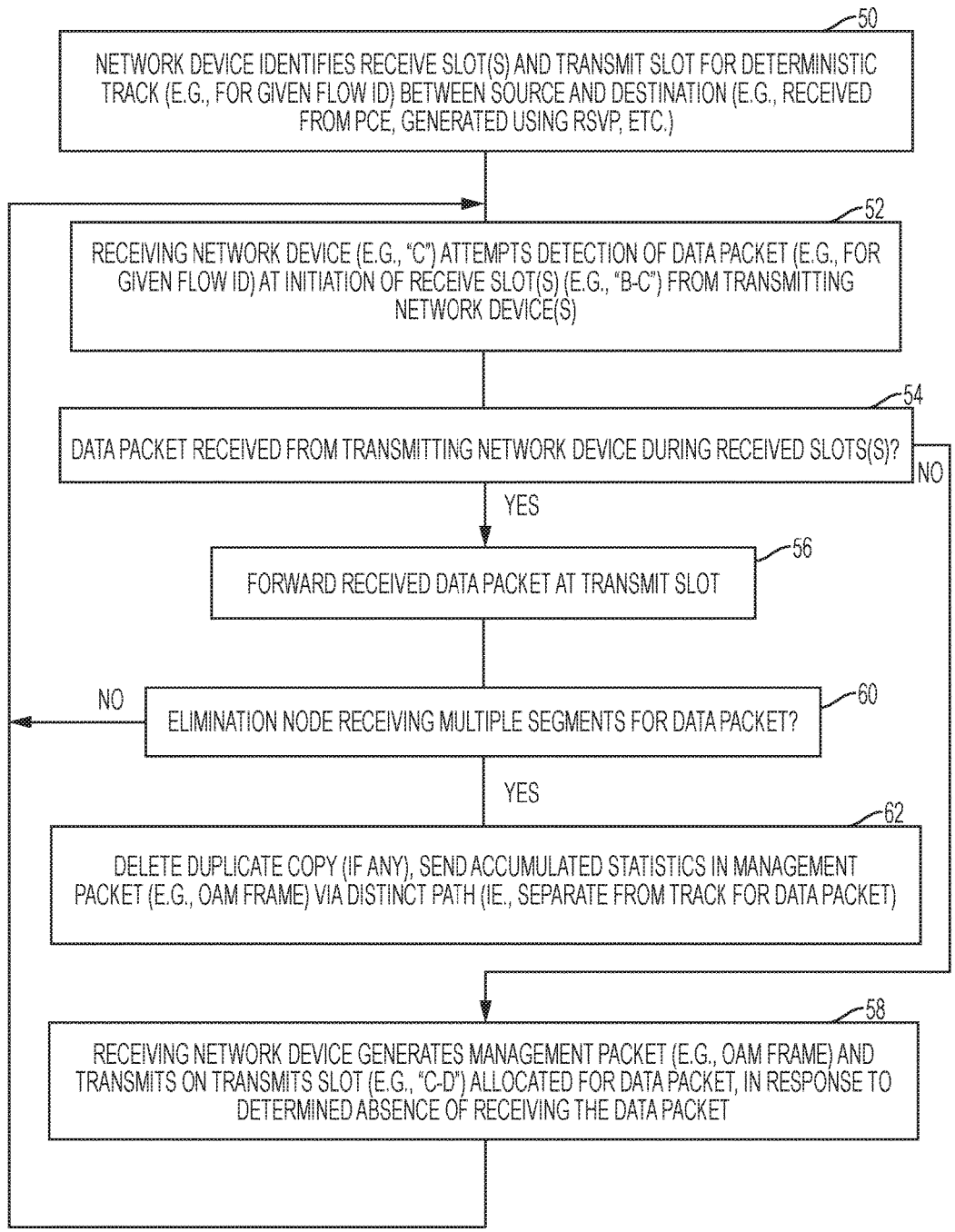
FIG. 4 illustrates an example method of generating and transmitting a management packet, in a deterministic transmit slot along a deterministic track allocated for a data packet, in response to a detected absence of receiving the data packet within a receive slot of the deterministic track, according to an example embodiment.

FIG. 4 illustrates an example method of a network device 20 generating and transmitting a management packet 16, in a deterministic transmit slot along a deterministic track 12 (or 12') allocated for a data packet 14, in response to a detected absence of receiving the data packet 14 within a receive slot of the deterministic track 12 (or 12'), according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the deterministic track 12 (or 12') can be established based on the network devices 20 identifying their associated deterministic transmit slot 22 and/or deterministic receive slot 22 for deterministic forwarding of the data packet 14 through the deterministic network 10. For example, the processor circuit 32 in the source network device "SRC" 20s is configured for identifying in operation 50 allocation of a deterministic transmit slot 22a for deterministic transmission of the data packet 14 toward the destination network device "E" 20e via the next-hop network device 20a, and the processor circuit 32 in the destination network device "E" 20e is configured for identifying in operation 50 allocation of a deterministic receive slot 22e for deterministic reception of the data packet 14 via a deterministic track 12 (or 12'). The processor circuit 32 in each intermediate network device 20 (e.g. 20a, 20b, 20c, 20d, 20f, 20g) is configured for identifying in operation 50, as part of formation of the corresponding deterministic track 12 (or 12'), allocation of a deterministic receive slot 22 (e.g., 22c for network device 20c; 22d for network device 20d) reserved for receiving the data packet 14 from a transmitting network device 20, and a deterministic transmit slot 22 (e.g., 22d for network device 20c; 22e for network device 20e), for transmitting the data packet 14 toward the destination network device 20e along the deterministic track 12 (or 12').

The deterministic track 12 (or 12') can be established in operation 50 between a source network device and a destination network device, for example, based on flow identifier for an identified flow of data packets. The deterministic track 12 (or 12') in operation 50 can be established centrally by a central controller such as the PCE 28, for example based on a network device 20 receiving from the PCE 28 a message specifying the deterministic transmit slot and deterministic receive slot allocated to the network device 20, enabling the network device 20 to deterministically receive and forward the data packet 14. The establishment of the deterministic track 12 (or 12') also can be distributed between the network device 20, for example according to Resource Reservation Protocol (RSVP) according to RFC 2205, Resource Reservation-Traffic Engineering Protocol (RSVP-TE) according to RFC 5151, etc. Hence, the processor circuit 32 in each network device 20 can identify the allocated cells 22, as appropriate, either based on received instructions from the PCE 28 or based on a request-response protocol along a given path between the source network device and destination network device, for example using RSVP-TE.

As illustrated in FIG. 2, the processor circuit 32 of the network device 20d can be configured for identifying in operation 50 allocation of the allocated cell 22h as a receive slot reserved for reception of a replicated copy 14' of the data packet 14, from the network device 20g associated with forwarding the data packet along the second deterministic segment 44b. Hence, the network device 20d, illustrated as an "elimination node", can identify that it can receive the data packet 14 from the network device 20c at the allocated cell 22d, or the replicated copy 14' of the data packet from the network device 20g at the allocated cell 22h.

The forwarding of the data packet 14 along the deterministic track 12 (or 12') can be executed for each instance of the CDU matrix 24, where the network device "SRC" 20s can transmit the data packet 14 to the network device 20a at the allocated cell 22a.

The processor circuit 32 of each receiving network device (e.g., 20a, 20b, 20c, 20d, 20f, and 20g) in operation 52 attempts detection of the data packet 14 (and/or its replicated copy 14') at the initiation of the allocated receive slot from the transmitting network device. For example, the network device 20c can attempt to detect reception of the data packet 14 at the initiation of the deterministic receive slot "B-C" 22c from the transmitting network device 20b; the elimination node 20d in FIG. 2 can attempt in operation 52 to detect the data packet 14 within the receive slot 22d, and the replicated copy 14' within the receive slot 22h.

If in operation 54 the network device (e.g., 20a) receives the data packet 14 from its transmitting network device (e.g., 20s) during the allocated receive slot (e.g., 22a), the processor circuit 32 in operation 56 can forward the received data packet 14 to its next-hop successor network device (e.g., 20b) at the allocated transmit slot (e.g., 22b). As illustrated in FIG. 2, the network device 20a, as a replication node, can output the replicated copy 14' along the second deterministic segment 44b at the allocated transmit slot 22f. As illustrated in FIGS. 1 and 2, the network devices 20b, 20f, and 20g each are configured for outputting the data packet 14 (or replicated copy 14') at the associated transmit slots 22c, 22g, and 22h, respectively.

The processor circuit 32 of each network device 20 is configured in operation 54 for detecting an absence 18 of receiving the data packet 14 at the allocated receive slot; as illustrated in FIG. 1, the processor circuit 32 of the network device 20c can detect the absence 18 of receiving the data packet 14 from the network device 20b at the allocated receive slot 20c, for example due to wireless interference, etc.

In response to detecting the absence 18 of receiving the data packet 14 in operation 54, the processor circuit 32 of the network device 20c in operation 58 is configured for generating a management packet 16 (e.g., an OAM frame) and transmitting the management packet 16 along the deterministic track 12 (or 12') on the transmit slot "C-D" 22d having been allocated for transmission of the data packet 14 from the network device 20c to the network device 20d. As described below with respect to FIG. 5, the management packet 16 can identify one or more attributes associated with the absence 18 of receiving the data packet 14.

The processor circuit 32 of the network device 20d in FIG. 1, in response to receiving the management packet 16 during the receive slot 22d, detects in operation 54 the absence of receiving the data packet 14, and forwards the management packet 16 (optionally after updating with additional accumulated statistics) along the deterministic track 12' to the network device 20e on the transmit slot "D-E" 22e. Hence, the network device 20e can respond to the management packet 16, as appropriate, for example logging the management packet 16, sending a message to a management entity such as the PCE 28, etc.

FIG. 2 illustrates the network device 20d as an elimination node, where the processor circuit 32 of the network device 20d can detect the absence of receiving the data packet 14 (based on the received management packet 16 during the receive slot 22d) and reception of the replicated copy 14' during the receive slot 22h. In response to receiving the replicated copy 14' of the data packet 14 in the allocated cell 22h, the processor circuit 32 in operation 56 can forward the replicated copy 14' along the deterministic segment 44a to the network device 20e in the transmit slot 22e. Since in operation 60 the network device 20d is an elimination node receiving the multiple segments 44a, 44b for the data packet 14, normally the network device 20d in operation 62 would delete any duplicate copy of the data packet 14 (assuming there was no detected failure 18 and both the data packet 14 and the replicated copy 14' was received by the network device 20d); however since FIG. 2 illustrates that the network device 20d received the management packet 16 during the allocated cell 22d and the replicated copy 14' during the allocated cell 22h, the processor circuit 32 of the network device 20d in operation 62 is configured for forwarding the management packet 16 (after optionally adding any accumulated statistics) to the network device 20e via a distinct path, illustrated in FIG. 2 by the allocated cell 22i that is distinct from either the deterministic segment 44a or the deterministic segment 44b.

Figure 5:
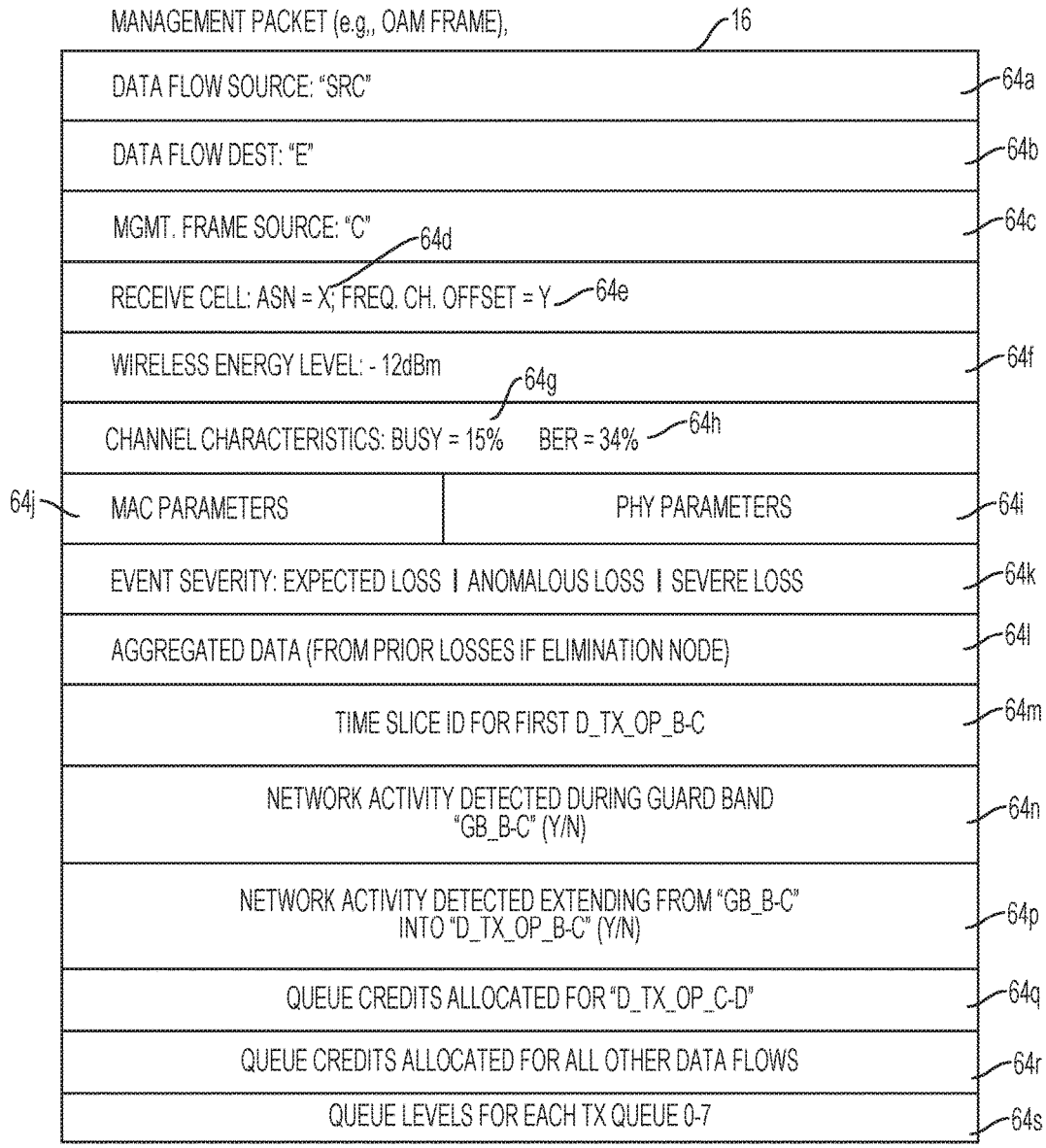
FIG. 5 illustrates an example management packet, according to an example embodiment.

FIG. 5 illustrates an example management packet 16, according to an example embodiment. Although not shown in FIG. 5, the management packet 16 can include a packet header that identifies the type of data packet as "management"; for example, an Ethertype field in the packet header can be used to identify the packet type as "management", enabling any network device 20 to distinguish the management packet 16 from a data packet 14.

FIG. 5 illustrates that the management packet 16 identifies one or more attributes 64 associated with the absence 18 of receiving the data packet 14. Example attributes 64 can include: an identifier 64a for the data flow source 20s; an identifier 64b for the data flow destination 20e; an identifier 64c for the management frame source that generated the management packet 16 (e.g., network device "C" 20c); an identifier "X" 64d identifying the transmission time of the receive slot (e.g., 22c) relative to the prescribed time domain of the deterministic network (e.g., ASN number), and an identifier 64e identifying a frequency channel "Y" allocated for the transmission of the data packet at the receive slot (e.g., 22c).

Additional attributes 64 can be added to the management packet 16 specifying detected conditions that can be relevant in identifying the cause of the detected failure 18, for example an identifier 64f identifying a detected (ambient) wireless energy level detected by the first network device during the receive slot (e.g., 22c), identifiers 64g and 64h identifying detected wireless channel characteristics associated with the frequency channel "Y" in use for the receive slot (e.g., 22c), for example the identifier 64g identifying the percentage that the frequency channel was found "busy" (e.g., due to co-channel interference), or the identifier 64h identifying a bit error rate (BER).

Additional attributes 64 can be obtained from the device interface circuit 30, for example an identifier 64i identifying one or more physical layer (PHY) transceiver parameters (e.g., detected receive signal strength indicator (RSSI), etc.), or an identifier 64*j* identifying one or more media access (MAC) parameters. The management packet 16 also can specify an event severity identifier 64*k* describing the absence 18 as at least one of a statistically expected loss, an anomalous loss, or a severe loss. The management packet 16 also can specify additional aggregated data 64*l* for multiple absences of receiving the data packet 14 relative to multiple instances of the receive slot (22*c*) in the repeating deterministic schedule of the CDU matrix 24 in the deterministic network 10.

According to example embodiments, a management packet 16 can be inserted into a deterministic track 12 (or 12') in response to a detected absence (i.e., failure) 18 of receiving a data packet 14 along the deterministic track 12 (or 12'), enabling a network device to use the transmit slot (having been allocated for the data packet 14) for transmission of the management packet 16 along the deterministic track 12 (or 12') to the destination device, in place of the lost data packet. The example embodiments enable early and precise detection of packet loss at a specific link (e.g., "B-C") and a specific allocated cell (e.g., 22*c*) along the deterministic track (or along a deterministic segment of the deterministic track), and the management packets can specify information that enables the destination network device to evaluate precisely the packet loss(es) at the specific link and allocated cell, enabling the destination network device to execute early problem determination for potential corrective action initiated by the destination network device (e.g., report to a network management entity, request a new or changed deterministic track that avoids the specified link or uses another cell encountering less interference, etc.).

Although the example embodiments illustrated allocated cells with different frequency offsets at different timeslots, the example embodiments can be implemented using a time division-multiplexed system using a single frequency. Further, any one of the intermediate network devices 20 also can be implemented as a switching device providing the necessary timing and/or synchronization intervals to receive and/or transmit data packets as described with respect to the transmit or receive slots.

Opportunistic Management Packet Insertion in Wired Deterministic Network

FIG. 6 illustrates a variation of FIGS. 1-5, where the deterministic network system 10' comprises wired data links 42 for establishment of one or more wired deterministic paths 70 via the intermediate network devices 20*a*, 20*b*, 20*c*, and 20*d* to the destination device 20*e*: the intermediate network devices 20*a*, 20*b*, 20*c*, and/or 20*d* can execute the opportunistic insertion of the management packet 16 in response to detecting an absence of a data packet 14 expected at a deterministic transmit opportunity (e.g., 72*c*).

In contrast to the allocated cells 22 for the deterministic track 12 of FIG. 1 (or 12' of FIG. 2), the PCE 28 can allocate deterministic transmit opportunities 72 to each of the network devices 20*s*, 20*a*, 20*b*, 20*c*, and 20*d* for establishment of a deterministic path 70 from the source network device 20*s* to the destination device 20*e*, for example according to time sensitive networking (TSN) and/or audio/video bridging (AVB). Hence, the PCE 28 can allocate the deterministic transmit opportunities 72 in a wired data network, for example according to TSN based on the PCE 28 allocating time slices and guard bands for each of the deterministic transmit opportunities 72; the PCE 28 also can allocate the deterministic transmit opportunities 72 according to AVB based on allocating queue credits to each of the network devices 20*s*, 20*a*, 20*b*, 20*c*, and 20*d* that ensure the data packet 14 is propagated along the deterministic path 70 within a bounded latency at each hop without congestion, thereby ensuring a bounded latency.

Hence, in response to the processor circuit 32 of a receiving network device (e.g., 20*c*) detecting the failure 18, i.e., the absence of receiving the data packet 14 from the transmitting network device (e.g., 20*b*) according to the allocated deterministic transmit opportunity 72*c*, the processor circuit 32 of the receiving network device (e.g., 20*c*) can generate the management packet 16, and deterministically transmit the management packet 16 to its next-hop successor network device (e.g., 20*d*) according to the deterministic transmit opportunity 72*d* allocated to the receiving network device (e.g., 20*c*).

Figure 7:
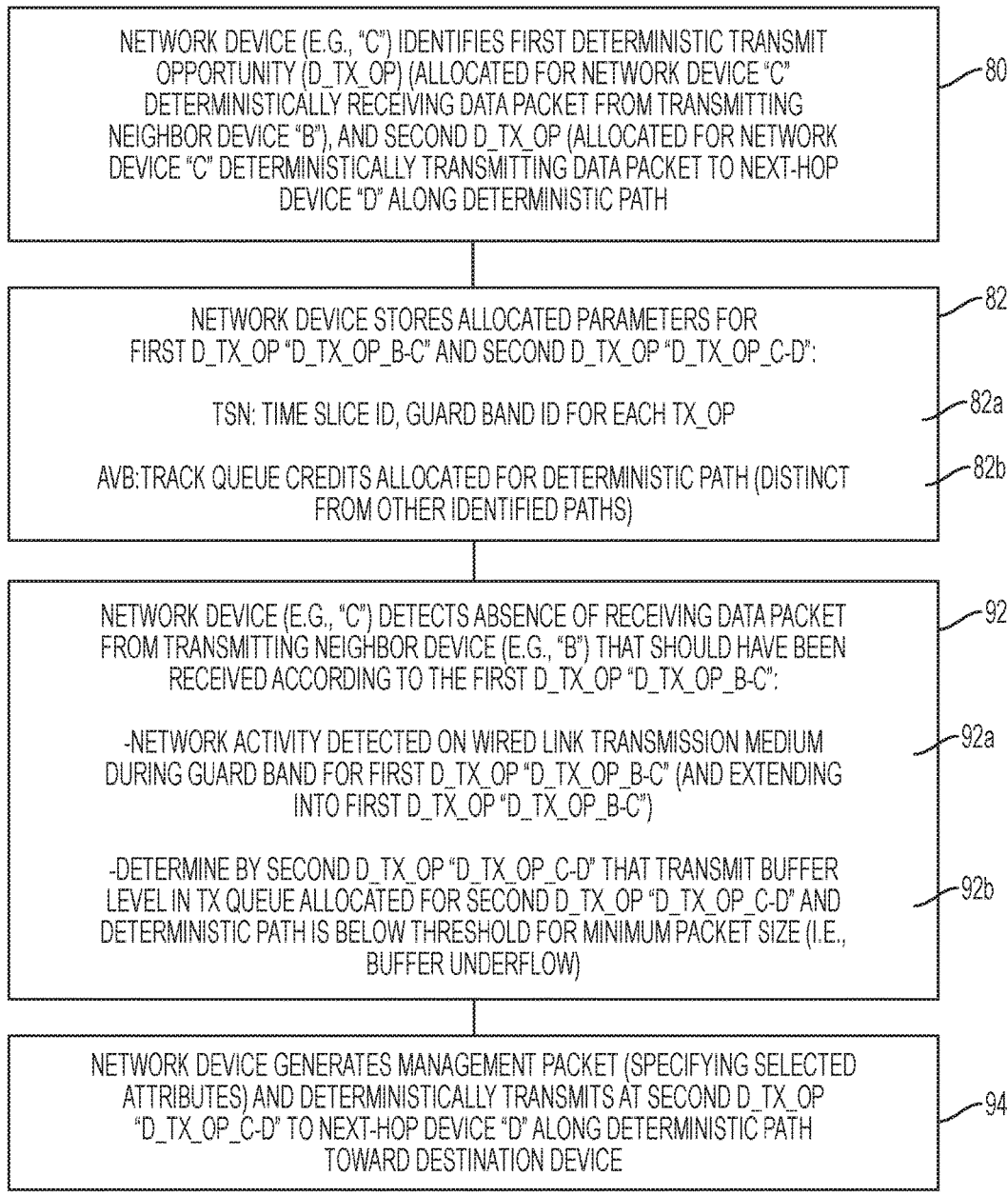
FIG. 7 illustrates an example method of a network device selectively generating and deterministically transmitting a management packet along a deterministic path to a destination device, in response to detecting an absence of receiving a data packet according to a first deterministic transmit opportunity, according to an example embodiment.

FIG. 7 illustrates an example method of a network device (e.g., 70*c*) selectively generating and deterministically transmitting a management packet 16 along a deterministic path 70 to a destination device 20*e*, in response to detecting an absence 18 of receiving a data packet 14 according to a first deterministic transmit opportunity "D_TX_OP_B-C" 72*c*, according to an example embodiment. Similar to the description with respect to FIGS. 1-5, the PCE 28 is configured for allocating, to each of the network devices 20*s*, 20*a*, 20*b*, 20*c*, and 20*d*, deterministic transmit opportunities 72 that guarantee that the data packet 14 can be propagated along the hop-by-hop deterministic path 70 and received by the destination device 20*e* by the deterministic transmit opportunity 72*e* allocated to the network device 20*d*.

For example, the PCE 28 in operation 80 can allocate the deterministic transmit opportunity 72*a* for deterministic transmission by the source network device "SRC" 20*s* to the network device 20*a*; the PCE 28 can allocate the deterministic transmit opportunity 72*b* for deterministic transmission of the data packet 14 by the network device 20*a* to the network device 20*b*; the PCE 28 can allocate the deterministic transmit opportunity 72*c* for deterministic transmission of the data packet 14 by the network device 20*b* to the network device 20*c*; the PCE 28 can allocate the deterministic transmit opportunity 72*d* for deterministic transmission of the data packet 14 by the network device 20*c* to the network device 20*d*; and the PCE 28 can allocate the deterministic transmit opportunity 72*e* for deterministic transmission of the data packet 14 by the network device 20*d* to the destination network device 20*e*. The PCE 28 can supply to each of one or more of the network devices 20*s*, 20*a*, 20*b*, 20*c*, 20*d*, and/or 20*e* deterministic path deployment instructions specifying its corresponding deterministic receive opportunity (i.e., the first deterministic transmit opportunity) that is reserved for receiving a data packet from a transmitting network device 20, and its corresponding deterministic transmit opportunity (i.e., the second deterministic transmit opportunity) that is reserved for corresponding deterministic transmission of the data packet toward the destination network device 20*e* along the deterministic path 70. Alternately, each of the network devices 20 can determine their deterministic receive and transmit opportunities based on a request-response protocol along a given path between the source network device and destination network device, for example using RSVP-TE.

Hence, the processor circuit 32 of each intermediate network device (e.g., 20*c*) can identify in operation 80, from its corresponding deterministic path deployment instructions (or request-response protocol), its "first" deterministic transmit opportunity (e.g., "D_TX_OP_B-C" 72*c*) that is reserved for the intermediate network device (e.g., 20*c*) to deterministically receive a data packet 14 from its neighboring network device (e.g., 20*b*); the processor circuit 32 of the network device (e.g., 20c) also can identify in operation 80 its "second" deterministic transmit opportunity (e.g., "D_TX_OP_C-D" 72d) that is reserved for the deterministic transmission of the data packet 14 by the network device (e.g., 20c) along the deterministic path 70 toward the destination network device 20e. As described below, in AVB deployments the network device 20c may only need to identify a prescribed time before its deterministic transmit opportunity 72d to determine if it has sufficient queue credits for transmission of a data packet stored in its transmit queue.

The processor circuit 32 of each intermediate network device (e.g., 20c) in operation 82 stores its allocated parameters for the associated deterministic receive and transmit opportunities (e.g., 72c and 72d), for example in the data structure 36 of its corresponding memory circuit 34 and/or in its MAC circuit 38. For example, in a TSN network the processor circuit 32 of the network device 20c in operation 82a can store a guard band identifier for an identified guard band "GB_B-C" associated with the deterministic transmit opportunity 72c, where the identified guard band can be identified as a prescribed amount of time contiguously preceding (i.e., immediately preceding) the first deterministic transmit opportunity "D_TX_OP_B-C" 72c. Further, the first deterministic transmit opportunity "D_TX_OP_B-C" 72c can be implemented as a prescribed "time slice" having a corresponding time slice identifier; hence, the processor circuit 32 of the network device 20c can store the time slice identifier and the corresponding guard band identifier "GB_B-C" for the first deterministic transmit opportunity "D_TX_OP_B-C" 72c that enables the network device 20c to determine when it is deterministically scheduled to receive the data packet 14 from the transmitting network device 20b.

Figure 8:
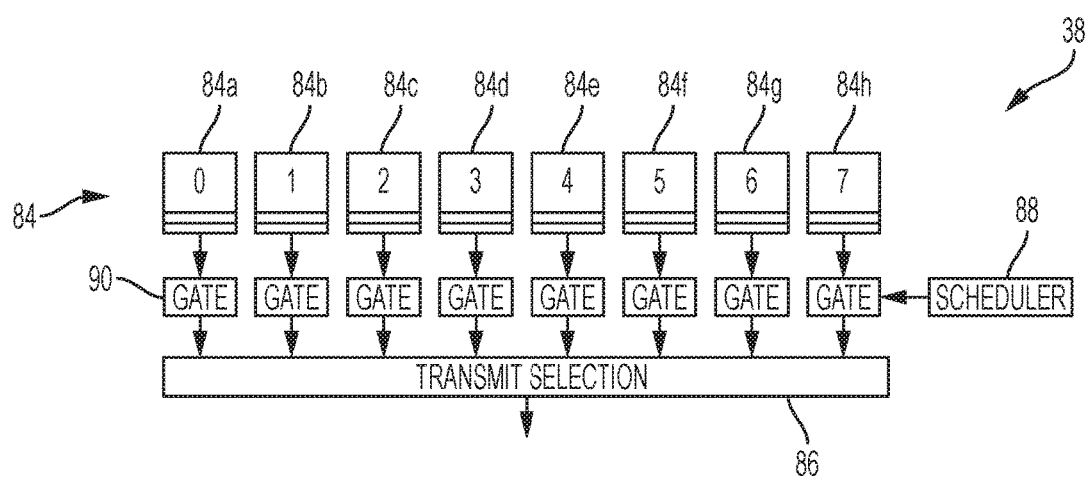
FIG. 8 illustrates example transmit queues in any of the network devices of FIG. 1 or 6, according to an example embodiment

Alternately, in an AVB network the processor circuit 32 of the network device 20c in operation 82b can track queue credits as they are received for deterministic transmission of the management packet 16 to the next-hop network device 20d along the deterministic path 70, where the received queue credits control the amount of data (e.g., in bytes) that can be transmitted from an identified transmit queue (e.g., 84h of FIG. 8). In particular, the MAC circuit 38 of FIG. 3 can include a plurality of transmit queues 84 for identified traffic flows, including for example transmit queues 84a-84f for non-deterministic data flows, the transmit queue 84g for another different deterministic data flow, and the transmit queue 84h associated with the deterministic path 70 for the identified flow of data packets 14 from the source network device 20s to the destination network device 20e. Hence, the transmit selection 86 by the scheduler 88 in the MAC circuit 38 can be controlled by the number of queue credits received for each identified flow before the desired transmission time, such that the queues 84a through 84g can be blocked from transmission by the scheduler 88 closing a corresponding "gate" 90 due to an insufficient number of queue credits, whereas the network device 20c can receive for the transmit queue 84h a maximum number of queue credits before an identified time associated with the deterministic transmit opportunity 72d. Hence, the scheduled allocation of queue credits among the network devices 20s, 20a, 20b, 20c, 20d (e.g., by the PCE 28, the source network device 20s and/or the destination network device 20e) enable the associated transmit buffers 84h to be maximized for a guaranteed bandwidth, ensuring the deterministic reception by the network device 20e within a bounded latency.

Following storage of the allocated parameters that define the first deterministic transmit opportunity "D_TX_OP_B-C" 72c and the second deterministic transmit opportunity "D_TX_OP_C-D" 72d, the device interface circuit 30 in operation 92 can begin waiting for reception of the data packet 14 from the network device 20b according to the first deterministic transmit opportunity "D_TX_OP_B-C" 72c. For example, in TSN deployments the PHY circuit 40a can begin monitoring for any network activity on the wired data link 42a as of the beginning of the guard band "GB_B-C" contiguously preceding the associated time slice for the first deterministic transmit opportunity "D_TX_OP_B-C" 72c.

The processor circuit 32 of the network device 20c in operation 92a can detect the absence 18 of receiving the scheduled data packet 14 in TSN deployments in response to detecting network activity on the wired data link 42a during the guard band "GB_B-C", where the network activity continues into the beginning of the corresponding time slice allocated for the first deterministic transmit opportunity "D_TX_OP_B-C" 72c, indicating another (previously-transmitted) data packet is interfering with transmission of the data packet 14 by the network device 20b at the deterministic transmit opportunity 72c.

Alternately, the processor circuit 32 of the network device 20c in operation 92b can determine, in TSN and/or AVB deployments the absence 18 of receiving the data packet 14 from the network device 20b according to the deterministic transmit opportunity 72c based on determining, by the second deterministic transmit opportunity "D_TX_OP_C-D" 72d (i.e., immediately preceding initiation thereof), that the corresponding transmit buffer level in the transmit queue 84h allocated for the second deterministic transmit opportunity "D_TX_OP_C-D" 72d is below the prescribed threshold for a minimum size of the data packet 14, resulting in buffer underflow in the transmit queue 84h.

In response to determining in operation 92 the absence 18 of the data packet 14 that should have been received by the network device 20c during the deterministic transmit opportunity 72c, the processor circuit 32 of the network device 20c in operation 94 can generate the management packet 16, and deterministically output at the second deterministic transmit opportunity "D_TX_OP_C-D" 72d the management packet 16 onto the wired data link 42a for deterministic reception by the next-hop network device 20d along the deterministic path 70 to the destination network device 20e.

Hence, the processor circuit 32 of the network device 20c can notify the destination network device 20e, via the management packet 16, of the detected failure 18 in receiving the data packet 14. As illustrated in FIG. 5, example attributes that can be inserted in operation 94 relative to the wired deterministic network 10' deploying TSN can include a time slice identifier 64m for the time slice allocated for the first deterministic transmit opportunity "D_TX_OP_B-C" 72c, a network activity indicator 64n identifying whether any network activity was detected (e.g., in operation 92) during the corresponding guard band (e.g., "GB_B-C") associated with the deterministic transmit opportunity 72c, and/or a second indicator 64p indicating whether the network activity extended beyond the guard band (e.g., "GB_B-C") and into the corresponding time slice of the first deterministic transmit opportunity "D_TX_OP_B-C" 72c. Hence, the destination network device 20e can determine if there is another data packet that is interfering with the deterministic transmission of the data packet 14 at the deterministic transmit opportunity 72c.

The processor circuit 32 of the network device 20c also can specify within the management packet 16 AVB-based attributes, for example a first number of queue credits 64q allocated to the transmit queue 84h of the network device 20c for transmission of the data packet 14 by the network device 20*c* at the deterministic transmit opportunity 72*d*, and/or a second number of queue credits 64*r* allocated to the other queues 84*a*-84*g* for the transmission of data packets from other identified flows. The processor circuit 32 of the network device 20*c* also can specify within the management packet 16 one or more queue levels 64*s* for each of the queues 84*a* through 84*h*, including the queue 84*h* allocated for reception of the data packet of the first network device at the first deterministic transmit opportunity and transmission at the deterministic transmit opportunity 72*d*. Hence, the destination network device 20*e* can determine whether the failure 18 was due to a mis-allocation of queue credits among the different network devices 20 or among different data flows.

Since AVB network traffic can have one or more stochastic properties that can cause false positives with respect to detection of a lost data packet, in a further embodiment a network device 20 (e.g., the network device 20*c* detecting the failure 18, the destination network device 20*e* and/or the PCE 28) can be configured to execute additional operations to identify false positives. For example, a network device 20 can be configured to interpret the application flow or transport counters associated with the identified data flow associated with the data packet 14; hence, upper layers executed in the network device (e.g., transport layer, application layer) can determine whether the detected failure 18 was an actual packet loss or a false positive that can be ignored.

According to example embodiments, a management packet can be opportunistically inserted into a wired deterministic path in response to a detected failure of receiving a data packet along the wired deterministic path, enabling a destination network device to acquire information related to the detected failure. The management packet enables the destination network device to initiate corrective measures in response to the detected failure, including not only correction of the deterministic path (e.g., stopping interfering traffic flows that interfere with the deterministic path), but also initiation of corrective application-level procedures to mitigate the loss of the expected data packet.

Hence, the example embodiments enable in-band management of any type of deterministic network, including wired networks, wireless (e.g., 6TiSCH) networks, or a combination thereof.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
a first network device in a deterministic network identifying at least one of first and second deterministic transmit opportunities reserved for transmission of a data packet toward a destination device along a deterministic path of the deterministic network, the first deterministic transmit opportunity reserved for the first network device deterministically receiving the data packet on a first data link along the deterministic path and transmitted onto the first data link by a second network device, and the second deterministic transmit opportunity reserved for deterministic transmission by the first network device of the data packet onto a second data link along the deterministic path toward the destination device;

the first network device detecting a failure in the first network device receiving the data packet, including detecting an absence of receiving the data packet from the second network device according to the first deterministic transmit opportunity; and
the first network device selectively generating and opportunistically transmitting onto the second data link according to the second deterministic transmit opportunity, in response to the failure of the first network device receiving the data packet, a management packet along the deterministic path in place of the data packet that was absent at the first deterministic transmit opportunity.

2. The method of claim 1, wherein the management packet identifies one or more attributes associated with the absence of receiving the data packet.

3. The method of claim 2, wherein the management packet specifies any one of:
a time slice identifier associated with the first deterministic transmit opportunity; or
a network activity indicator identifying whether any network activity was detected during a guard band contiguously preceding the first deterministic transmit opportunity.

4. The method of claim 2, wherein the management packet specifies any one of:
a first number of queue credits allocated to the first network device for transmission of the data packet by the first network device; or
a second number of queue credits allocated to the first network device for transmission of any received data packets distinct from the deterministic path for the data packet.

5. The method of claim 2, wherein the management packet specifies any one of:
a processor utilization of the first network device at the first deterministic transmit opportunity;
a memory utilization of the first network device at the first deterministic transmit opportunity;
a queue level of a queue allocated for reception of the data packet of the first network device at the first deterministic transmit opportunity;
one or more physical layer (PHY) transceiver parameters; or
one or more media access (MAC) parameters.

6. The method of claim 2, wherein the attributes include an event severity describing the absence of receiving the data packet during the first deterministic transmit opportunity.

7. The method of claim 1, wherein the detecting the absence includes the first network device determining, by initiation of the second deterministic transmit opportunity, that a corresponding transmit buffer level of a transmit buffer associated with the second deterministic transmit opportunity is below a prescribed threshold corresponding to a prescribed minimum size of the data packet.

8. An apparatus comprising:
a device interface circuit; and
a processor circuit configured for identifying at least one of first and second deterministic transmit opportunities reserved for transmission of a data packet toward a destination device along a deterministic path of a deterministic network, the apparatus operating as a first network device in the deterministic network, the first deterministic transmit opportunity reserved for the apparatus deterministically receiving the data packet on a first data link along the deterministic path and transmitted onto the first data link by a second network device, and the second deterministic transmit opportunity reserved for deterministic transmission by the apparatus of the data packet onto a second data link along the deterministic path toward the destination device;

the processor circuit further configured for detecting a failure in the first network device receiving the data packet, including detecting an absence of receiving the data packet from the second network device according to the first deterministic transmit opportunity;

the processor circuit further configured for selectively generating and opportunistically transmitting onto the second data link via the device interface circuit, according to the second deterministic transmit opportunity in response to the failure of the first network device receiving the data packet, a management packet along the deterministic path in place of the data packet that was absent at the first deterministic transmit opportunity.

9. The apparatus of claim 8, wherein the processor circuit is configured for inserting within the management packet one or more attributes associated with the absence of receiving the data packet.

10. The apparatus of claim 9, wherein the processor circuit is configured for inserting into the management packet any one of:
 a time slice identifier associated with the first deterministic transmit opportunity; or
 a network activity indicator identifying whether any network activity was detected during a guard band contiguously preceding the first deterministic transmit opportunity.

11. The apparatus of claim 9, further comprising a memory circuit configured for storing the data packet in a queue, wherein the processor circuit is configured for inserting into the management packet any one of:
 a first number of queue credits allocated to the apparatus for transmission of the data packet by the first network device; or
 a second number of queue credits allocated to the apparatus for transmission of any received data packets distinct from the deterministic path for the data packet.

12. The apparatus of claim 9, further comprising a memory circuit configured for storing the data packet in a queue, wherein the processor circuit is configured for inserting into the management packet any one of:
 a processor utilization describing utilization of the processor circuit at the first deterministic transmit opportunity;
 a memory utilization of the memory circuit at the first deterministic transmit opportunity;
 a queue level of the queue allocated for reception of the data packet of the first network device at the first deterministic transmit opportunity;
 one or more physical layer (PHY) transceiver parameters; or
 one or more media access (MAC) parameters.

13. The apparatus of claim 9, wherein the attributes include an event severity describing the absence of receiving the data packet during the first deterministic transmit opportunity.

14. The apparatus of claim 8, wherein:
 the apparatus further comprises a memory circuit comprising a transmit buffer configured for storing the data packet;
 the processor circuit configured for detecting the absence based on the processor circuit determining, by initiation of the second deterministic transmit opportunity, that a corresponding transmit buffer level of the transmit buffer associated with the second deterministic transmit opportunity is below a prescribed threshold corresponding to a prescribed minimum size of the data packet.

15. One or more non-transitory tangible media encoded with logic for execution by a machine and when executed by the machine operable for:
 the machine, operating as a first network device in a deterministic network, identifying at least one of first and second deterministic transmit opportunities reserved for transmission of a data packet toward a destination device along a deterministic path of the deterministic network, the first deterministic transmit opportunity reserved for the first network device deterministically receiving the data packet on a first data link along the deterministic path and transmitted onto the first data link by a second network device, and the second deterministic transmit opportunity reserved for deterministic transmission by the first network device of the data packet onto a second data link along the deterministic path toward the destination device;
 the first network device detecting a failure in the first network device receiving the data packet, including detecting an absence of receiving the data packet from the second network device according to the first deterministic transmit opportunity; and
 the first network device selectively generating and opportunistically transmitting onto the second data link according to the second deterministic transmit opportunity, in response to the failure of the first network device receiving the data packet, a management packet along the deterministic path in place of the data packet that was absent at the first deterministic transmit opportunity.

16. The one or more non-transitory tangible media of claim 15, wherein the management packet identifies one or more attributes associated with the absence of receiving the data packet.

17. The one or more non-transitory tangible media of claim 16, wherein the management packet specifies any one of:
 a time slice identifier associated with the first deterministic transmit opportunity; or
 a network activity indicator identifying whether any network activity was detected during a guard band contiguously preceding the first deterministic transmit opportunity.

18. The one or more non-transitory tangible media of claim 16, wherein the management packet specifies any one of:
 a first number of queue credits allocated to the first network device for transmission of the data packet by the first network device; or
 a second number of queue credits allocated to the first network device for transmission of any received data packets distinct from the deterministic path for the data packet.

19. The one or more non-transitory tangible media of claim 16, wherein the management packet specifies any one of:
 a processor utilization of the first network device at the first deterministic transmit opportunity;

a memory utilization of the first network device at the first deterministic transmit opportunity;

a queue level of a queue allocated for reception of the data packet of the first network device at the first deterministic transmit opportunity;

one or more physical layer (PHY) transceiver parameters; or one or more media access (MAC) parameters.

20. The one or more non-transitory tangible media of claim 15, wherein the detecting an absence includes the first network device determining, by initiation of the second deterministic transmit opportunity, that a corresponding transmit buffer level of a transmit buffer associated with the second deterministic transmit opportunity is below a prescribed threshold corresponding to a prescribed minimum size of the data packet.

\* \* \* \* \*